C. R. UNDERHILL.
BRAKE MECHANISM.
APPLICATION FILED MAR. 12, 1917.
1,309,377.
Patented July 8, 1919.
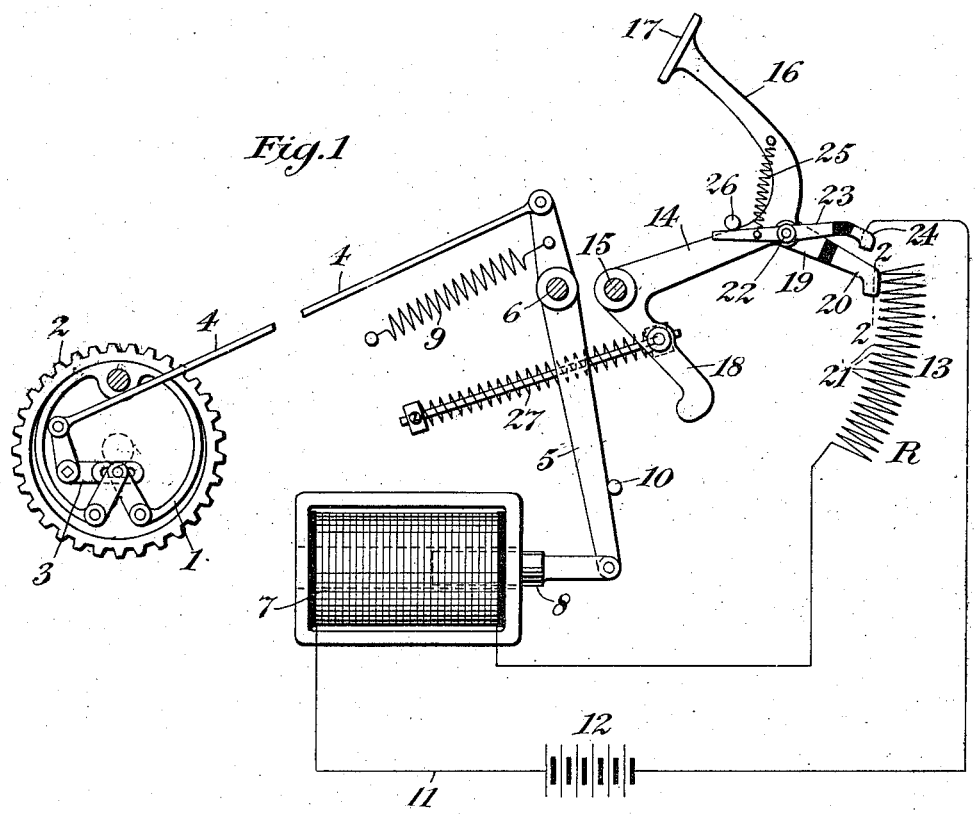
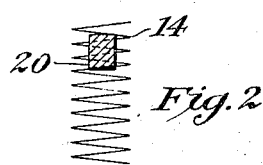
Inventor

UNITED STATES PATENT OFFICE.

CHARLES R. UNDERHILL, OF NEW HAVEN, CONNECTICUT.

BRAKE MECHANISM.

1,309,377.  Specification of Letters Patent.  Patented July 8, 1919.

Application filed March 12, 1917. Serial No. 154,297.

*To all whom it may concern:*

Be it known that I, CHARLES R. UNDERHILL, a citizen of the United States, and resident of New Haven, in the county of New Haven and State of Connecticut, have invented certain new and useful Improvements in Brake Mechanism, of which the following is a specification.

This invention relates to brake mechanism, and particularly to brake mechanism for a rotating element. The invention, which is particularly adapted for use in connection with motor cars or motor trucks, has for its main object to provide mechanism which is power operated and in which the effectiveness of the power-operated means may be considerably augmented by manually or pedal operated or controlled means.

It is a further object of the invention to so construct the mechanism that, should the power operated means become inoperative for any reason whatsoever, the manually or pedal operated or controlled device may be used, entirely, for setting the brakes.

The invention contemplates, broadly, the employment of any suitable power means for operating the braking member or members, and a suitable manually or pedal operated or controlled element for rendering the power means operative and effective to various degrees, which means is also operative to apply the braking member or augment the effect of the power means.

The embodiment of the invention illustrated in the drawing, which is chosen for the sake of convenience of illustration, includes a solenoid magnet, in the energizing circuit of which a suitable rheostat is interpolated. This circuit is open when the braking member is inoperative, but is automatically closed upon the operation of a pedal or a manually operated or controlled element, which, itself, coöperates with the rheostat to render the magnet more or less effective and to positively operate the braking member or members. It is, of course, to be understood that the electric power means may be replaced by various other types of power means, and when replaced by such latter means, the controlling element for the power means will be suitably modified to meet the particular conditions.

Referring to the embodiment illustrated in the drawing:—

Figure 1 is a diagrammatic view illustrating my improved brake mechanism for application to a motor car or truck; and Fig. 2 is a detail sectional view on line 2—2 of Fig. 1.

In the drawing, I have illustrated a conventional braking element which includes a band brake 1, of the expanding type, which is operative within a rotating member, such as a gear 2, and is operated by a suitable applying device 3, to which an operating rod 4 is connected. It is, of course, to be understood that this particular structure is in no way essential to the present invention, as any braking element may be used. The operating rod 4 is pivoted at one of its ends, that is to say, at the end remote from the brake-applying member 3, to a lever 5. This lever 5 is suitably pivoted between its ends, at 6, to any convenient support. Adjacent to the end remote from the rod 4 is located a solenoid magnet 7, the core 8 of which is pivoted to the adjacent end of the lever 5. Thus, it will be seen that upon the energization of the magnet, the core will be attracted and will be effective to move the lever 5 about its pivot in such a direction that the brake applying element 3 will be operated. The movement of the lever in the opposite direction is produced by a spring 9, or other suitable device, and this movement is limited by a stop 10. The magnet 7 is included in a normally open circuit 11 which includes, in addition to the source 12, a rheostat R. A controlling element 14, which, in the drawing, is disclosed as a pedal, but which may, as a matter of fact, be any suitable means, is pivoted at 15, and is provided with an upwardly extending arm 16 having a tread 17 thereon, and a downwardly extending arm 18, in the path of movement of which the lever 5 lies. A projection 19 extends from the pedal 14 and carries a contact 20, which is insulated from the projection. This contact 20 is adapted, when the pedal 14 is moved about its pivot by the depression of the tread 17, to engage successively a series of contacts 21 on the resistance coils 13, and is of sufficient length to bridge two or more of the contacts 21, so as to prevent sparking. To the pedal 14, at 22, a switch lever 23 is pivoted, which lever carries a contact 24. This contact 24 is insulated from the lever 23 and is adapted, when the lever is moved in one direction, to engage the contact 20, previously referred to. The normal tendency of the lever 23 to move the contact 24 into engagement with the contact 20 is produced by a suitable spring 25, which is connected to the lever and to the arm 16 of the pedal 14. The contacts 20 and 24 are, however, when the pedal 14 is in its inoperative position, held out of engagement with each other by a stop 26, against which the lever and the pedal are forced by a spring 27, which normally tends to move the pedal to its initial or inoperative position.

In operation, when the pedal 14 is depressed about its pivot, it will be moved away from the stop 26, as will also the lever 23. This will permit the contact 24 to move into engagement with the contact 20 under the influence of the spring 25, so as to complete the circuit through the magnet and resistance coils 13. At this preliminary stage of the operation of the pedal 14, the contact 20 will be in engagement with the endmost of the resistance coils 13, so that all of the coils will be cut into the circuit, and, consequently, the solenoid magnet 7 will, at this time, be least effective. As the pedal is first depressed, the coils will be successively cut out of circuit and the magnet rendered gradually more effective to move the lever 5. It will, of course, be understood that this successive cutting out of the resistance coils will have the effect of causing the gradual application of the braking member or members. It will thus be seen that the braking member or members will be applied automatically by a suitable power means, and that the power means will be under the control of the operator.

The pedal 14 may be depressed to such an extent that the arm 18 will engage the lever 5 between its pivot point and the point to which the core 8 of the magnet is attached, so that upon subsequent and further depression of the pedal, the effect of the magnet 7 will be considerably augmented by the positive force transmitted through the pedal 14 to the lever 5 and the connecting means between the lever and the braking member or members.

Of course, it will be understood that should the power operating means become, for any reason whatever, ineffective, the braking member or members may be applied by means of the pedal.

It will thus be seen that I have provided a braking mechanism wherein provision is made for the application of the braking member or members by power operating means, which means is controlled by a suitable means under the direct control of the operator, and that the latter means may be rendered effective to directly apply the braking member or members. The application of the braking member or members may, therefore, be readily accomplished by a person who is physically incompetent to apply the ordinary foot brake.

What I claim is:—

1. In a brake mechanism, the combination with a braking member, electrical mechanism for operating the same, means for controlling the electrical mechanism to render it effective to various degrees, which means is subsequently operable to augment the braking effect of said electrical mechanism, and means for automatically returning the controlling means to its initial position to render the same inoperative.

2. In a brake mechanism, the combination with a braking member, of an element for operating the same, an electro-magnet for initially actuating said element, and a pedal adapted to close the magnet circuit upon its initial movement and to act directly on the brake operating element to actuate the same after the initial actuation by the magnet.

3. In a brake mechanism, the combination with a braking member, of an operating lever therefor, an electro-magnet for actuating the lever, a pedal having means thereon for closing the magnet circuit and having a projection adapted to engage the lever to actuate the same after its initial actuation by the magnet.

4. In a brake mechanism, the combination with a braking member, of an operating lever therefor, a solenoid magnet for actuating said lever, an electrical circuit including said magnet, a rheostat in said circuit, a pedal having a controlling contact for said rheostat, a switch carried by the pedal for controlling the circuit, means on the pedal adapted to contact with the lever to operate the brake directly, and means for returning the pedal to its initial position to release the brake and open the magnet circuit.

Signed at New York, in the county of New York and State of New York, this 7th day of March, A. D. 1917.

CHARLES R. UNDERHILL.

Witnesses:
 CHAS. F. DANE,
 C. J. BUTLER.